(12) United States Patent
Rogers

(10) Patent No.: US 10,194,496 B2
(45) Date of Patent: Jan. 29, 2019

(54) CONTINUOUS LIGHT STRIP, SYSTEM AND METHOD

(71) Applicant: Charles Brian Rogers, Clearwater, FL (US)

(72) Inventor: Charles Brian Rogers, Clearwater, FL (US)

(*) Notice: Subject to any disclaimer, the term of this patent is extended or adjusted under 35 U.S.C. 154(b) by 51 days.

(21) Appl. No.: 15/242,456

(22) Filed: Aug. 19, 2016

(65) Prior Publication Data

US 2017/0055319 A1 Feb. 23, 2017

Related U.S. Application Data

(60) Provisional application No. 62/207,076, filed on Aug. 19, 2015.

(51) Int. Cl.
*H05B 33/08* (2006.01)

(52) U.S. Cl.
CPC ..... *H05B 33/0812* (2013.01); *H05B 33/0821* (2013.01); *H05B 33/0827* (2013.01); *H05B 33/0845* (2013.01); *H05B 33/0857* (2013.01)

(58) Field of Classification Search
None
See application file for complete search history.

(56) References Cited

U.S. PATENT DOCUMENTS

2007/0046485 A1* 3/2007 Grootes ............. H05B 33/0815
340/815.45

\* cited by examiner

*Primary Examiner* — Jimmy Vu
*Assistant Examiner* — Laura Yesildag
(74) *Attorney, Agent, or Firm* — The Compton Law Firm, P.C.; Scott D. Compton

(57) ABSTRACT

An LED strip operable with a single input source of current providing for an extended length LED strip of continuous illumination. The LED strip includes a repeating pattern of LED circuits along a printed circuit board; each LED circuit having a constant current regulator and a plurality of LEDs in serial configuration with the constant current regulator.

17 Claims, 12 Drawing Sheets

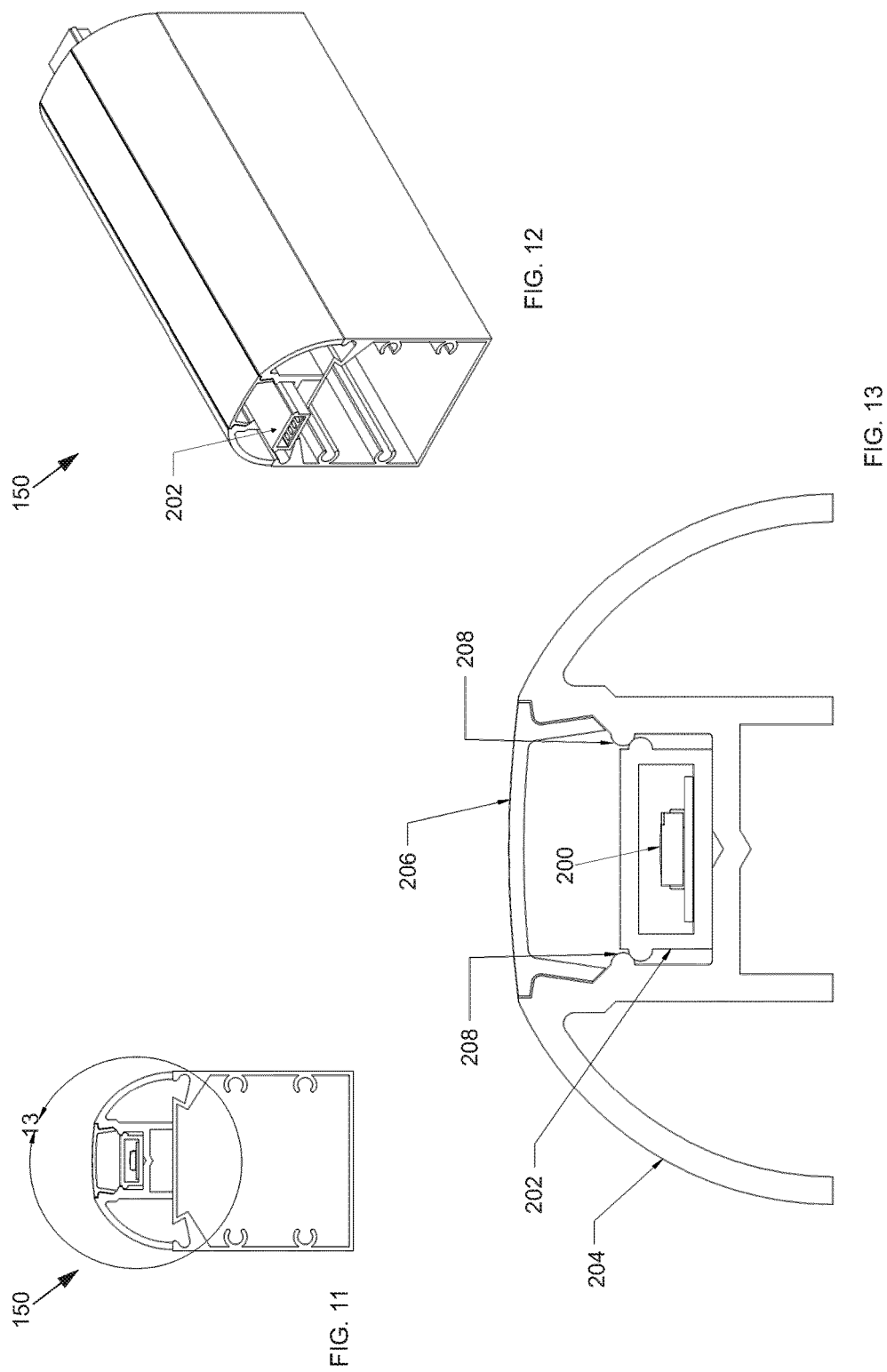

CONTINUOUS LIGHT STRIP, SYSTEM AND METHOD

CROSS-REFERENCE TO RELATED APPLICATIONS

This Application claims priority on earlier filed U.S. Provisional Application No. 62/207,076, filed on Aug. 19, 2015.

STATEMENT REGARDING FEDERALLY SPONSORED RESEARCH OR DEVELOPMENT

Not applicable.

FIELD OF THE APPLICATION

The application relates generally to light emitting diode strip lighting.

BACKGROUND OF THE APPLICATION

Currently, no low voltage light emitting diode ("LED") strips are commercially available that can operate for more than about ten (10.0) meters (about 32.0 feet) in length continuously without the need for an additional direct connection to a power source to overcome "voltage lag." Overcoming such a limitation is desired.

SUMMARY OF THE APPLICATION

The present application is directed to an LED strip of a repeating pattern of LED circuits, the LED strip including a printed circuit board; each LED circuit of the LED strip including a constant current regulator and a plurality of LEDs in serial configuration with the constant current regulator, wherein the LED circuits are disposed along the length of the printed circuit board, each of the constant current regulators being operationally configured to modulate current of its corresponding LED circuit to overcome variations in voltage by measuring the current in the LED circuit and adjusting its own corresponding voltage to maintain a constant current in its LED circuit. In one embodiment, the LED strip extends out to at least about 20.0 meters before the rail voltage of the LED strip falls below the sum of forward voltages of the LEDs in the LED strip.

BRIEF DESCRIPTION OF THE SEVERAL VIEWS OF THE DRAWING

FIG. 11 is a front elevational view of a distal end of an embodiment of an LED strip assembly.

FIG. 12 is a perspective view of the LED strip assembly of FIG. 11.

FIG. 13 is a detailed view of a portion of the LED strip assembly of FIG. 11.

DETAILED DESCRIPTION OF THE INVENTION

Figure 1:
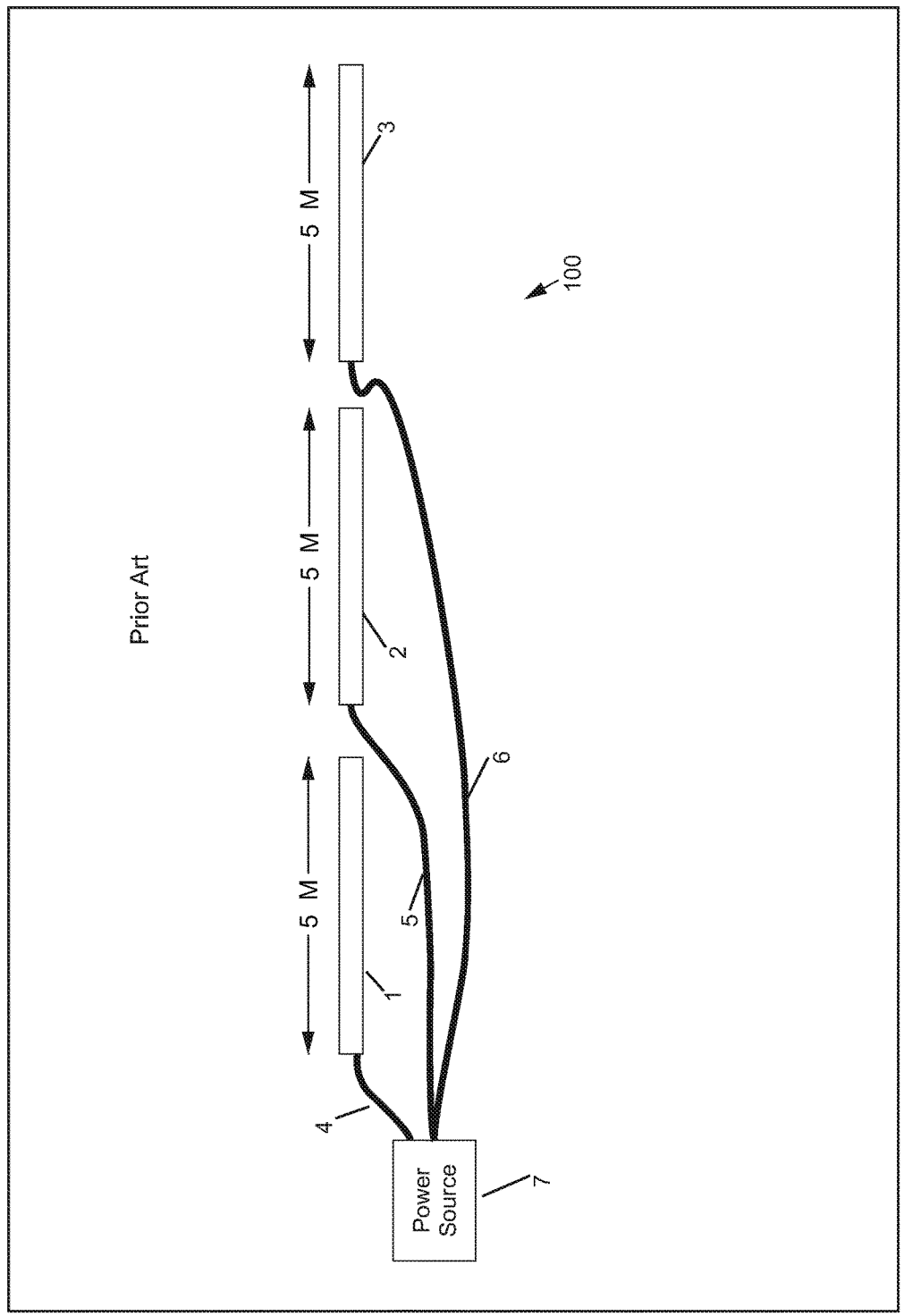
FIG. 1 is a simplified representation of a prior art 15.0 meter quasi-continuous LED strip incorporating three separate 5.0 meter LED strip segments.

Before describing the invention in detail, it is to be understood that the present invention is not limited to particular embodiments. It is also to be understood that the terminology used herein is for the purpose of describing particular embodiments only, and is not intended to be limiting. As used in this specification, the phrases "LED strip" and "LED light strip" refer to LED lighting including LEDs disposed along a substrate with LEDs located in a periodic pattern along the length of the substrate. Commercially available LED strips at the time of this application typically include an LED placed about every 2.54 cm (1.0 inches) along a target substrate. Commercially available LED strips as described above are available via the internet at https://www.superbrightleds.com. As understood by the skilled artisan, the width of an LED strip is often minimized as close to the geometry of the LED as possible. The substrates for LED strips may include a printed circuit board ("PCB"), which are typically manufactured from one or more materials including, but not necessarily limited to polyimide flex material, FR4 composite material, aluminum, and combinations thereof. Herein, a "continuously illuminable LED strip" refers to an LED strip assembly and system operationally configured to illuminate, as perceived by the human eye, a solid elongated band or strip of light a desired distance along one or more LED strips. In particular, a "continuously illuminable LED strip" of this application employs a secondary diffuser element to create a visual effect of continuous light along the LED strip even along otherwise non-illuminated areas between LEDs. As understood by the skilled artisan, a secondary diffuser spreads and/or mixes light from the LEDs.

Herein, the phrase "voltage lag" refers to the continual drop in voltage over the length of an LED strip. To those persons familiar with the concepts of electrical physics it is represented by ohms law:

$$Voltage = Resistance \times Current$$

Herein, voltage lag is a function of the resistance inherent in the electrical traces of the LED strip and the amount of current traveling through an LED strip. For purposes of this application, the phrase "quasi-continuous LED strip" refers to a commercially available LED strip that is not truly one continuous LED strip but is rather a combination of two or more individual LED strips. Quasi-continuous LED strips are implemented commercially because "voltage lag" cannot be overcome to maintain LED brightness by downstream circuits—meaning direct intermediate connectors must be employed between individual LED strips for supplying additional power to the quasi-continuous LED strip to bolster the voltage at each circuit. Suitably, each intermediate connector lies in communication with its own power supply.

Herein, the phrase "rail voltage" refers to the main voltage used to drive LEDs and all known LED strip combinations are connected to a common "rail" as understood by the skilled artisan. The phrase "drive voltage" may be used interchangeably with the phrase "rail voltage." As understood by persons of ordinary skill in the art, the phrase "forward voltage" refers to the voltage drop across a diode if the voltage at the anode is more positive than the voltage at the cathode. As understood by persons of ordinary skill in the art, forward voltage is a fundamental function of LEDs and a specification provided by the manufacture of the LED. Typical values for LEDs that produce light in the visible region range from about 2.5 to about 3.2 Volts. As also understood by the skilled artisan, the phrase "extra low voltage" ("ELV") as applied to an extra low voltage device or circuit refers to a device or circuit in which the electrical potential between conductor or electrical conductor and ground does not exceed 50 V a.c. or 120 V d.c. For the purposes of this application such may also be referred to as "safety extra-low voltage ("SELV"). The phrase "resistor value" refers to the value of the resistors utilized in LED strips and is typically specified in ohms. The phrase "PCB resistance" refers to the inherent resistance of the traces that are present in the PCBs. PCB resistance is illustrated with reference to FIG. 3 as the oriented horizontally resistors labeled "Parasitic resistance." The phrase "low voltage directives" refers to directives and specifications published by domestic and international governing bodies that define safety for electrical devices. Current commercially available LED strips of the prior art provide up to about fifty-percent (50.0%) variation or degradation in brightness from the beginning of the LED strip to the opposing end of the LED strip. As understood by the skilled artisan, the human eye is capable of responding to an enormous range of light intensity, exceeding 10 units on logarithmic scale (i.e. minimum-to-maximum intensity variation of over 10-billion-fold). Inevitably, eye response to a signal intensity, which determines its apparent intensity, or brightness, is not linear. That is, it is not determined by the nominal change in physical stimulus (light energy), rather by its change relative to its initial level. As such, the phrase "functional LED strip length" herein refers to an LED strip with LED brightness that degrades less than about five-percent (5.0%) in brightness from the beginning of an LED strip to the opposing end of the LED strip.

In one aspect, the application provides at least a continuously illuminable LED strip operable with only one input source of current over a length greater than the ten meter length LED strips commercially available at the time of filing of this application.

In another aspect, the application provides at least a continuously illuminable LED strip that overcomes the problems of voltage lag found in commercially available LED strips, meaning that voltage drop over the length of the continuously illuminable LED strip does not cause any of the LEDs to be noticeably dimmer along the length of the LED strip.

In another aspect, the application provides a continuously illuminable LED strip feedback system that holds and measures the current and then changes the forward voltage to hold the current constant in each circuit provided.

In another aspect, the application provides a higher voltage, constant current continuously illuminable LED strip that contains Red, Green and Blue ("RGB") LEDs and can be modulated externally to control color and brightness.

In another aspect, the application provides a continuously illuminable LED strip effective to operate at higher than 12 Volts DC but well within certain "low voltage directives," which implies inherent safety and eliminate risk of electrocution.

In another aspect, the application provides a continuously illuminable LED strip having a curved outer surface configuration. As understood by the skilled artisan, the LED strip of this application may be provided as "peel-and-stick" with an adhesive backing.

In another aspect, the application provides continuously illuminable LED strip substrate hardware material operationally configured to house, enclose or otherwise protect LED strips against various impacts and other loads placed on the LED strip.

In another aspect, the application provides a continuously illuminable LED strip including a substrate hardware material and a corresponding snap-in type lens cover for (1) enclosing one or more light emitting diodes and (2) dispersing light emitted by the light emitting diodes evenly. The substrate hardware material may be attached to one or more target surfaces as desired.

In another aspect, the application provides substrate hardware material in the form of metal extrusion members for use with the LED strips of this application. In one embodiment, the metal extrusion members are operationally configured to match metal architectural support members for purposes of uniformity or aesthetic appeal.

In another aspect, the application provides an assembly including substrate hardware material and a complimentary sized elongated snap-in lens cover disposed up to the full length of one or more architectural support members. In another embodiment, a plurality of complimentary sized elongated snap-in lens covers may be employed with a one or more substrate hardware materials.

In another aspect, the application includes a novel design for a continuous LED strip that has a vastly improved functional visible brightness length over commercially available LED strips of about 10.0 meters in length.

In another aspect, the application includes a novel application of constant current feedback circuits to solve the limit of low functioning length LED strips. In other words, the application provides an LED strip employing current feedback to overcome voltage lag or drop over the length of the circuit provided.

In another aspect, the application includes a novel LED strip design that may be applied to multiple channels of LED running concurrently on the same LED strip, specifically a Red, Green and Blue LED.

In another aspect, the application provides a novel method of modulating Red, Green and Blue channels to achieve Color Mixing on LED strips greater than about 10.0 meters in length.

In another aspect, the application provides an LED strip including an extra low voltage supply of up to about 48 Volts.

In another aspect, the application provides an LED strip including thicker copper to accommodate more current that found in prior art LED strips. For example, while commercially available printed circuit boards of LED strips utilize one ounce copper, it is contemplated herein that the present invention may utilize two ounce copper on its LED strips.

Whereas currently available commercial LED strips include about a fifty-percent (50.0%) degradation in visual brightness over the advertised length of the LED strip, the present application provides an LED strip comprising about ten-percent (10.%) or less degradation in visual brightness over the length of an LED strip of about (10.0) meters (thirty-two (32.0) feet) or more.

In another aspect, the application provides a common anode RGB LED strip with cathode modulation support to create a full color palette. The LED strip including three consecutive channels on the same LED strip.

At the time of filing of this application no individual low voltage light emitting diode ("LED") strips are commercially available that have only one input source of current effective for operation at more than about ten (10.0) meters (thirty-two (32.0) feet) in length without the need for additional voltage to overcome voltage lag inherently present in commercially available LED strips. As the skilled artisan appreciates, at the time of filing of this application the state of the art includes commercially available LED strips provided in five (5.0) meter (16.4 feet) LED strips. Commercially available five (5.0) meter LED strips are common for lighting small areas in homes and other structures as well as for accent use in a multitude of architectural related applications. Turning to FIG. 1, in usages where extended length is desired beyond five (5.0) meters, multiple commercially available LED strips, e.g., quasi-continuous LED strips, are assembled in line, to extend a desired distance. As the example of FIG. 1 illustrates, each individual LED strip is individually powered in order to provide extended light emission over such extended lengths. In particular, in the simplified representation of FIG. 1, in order to provide a 15.0 meter quasi-continuous LED strip assembly 100, each 5.0 meter section of LED strip 1, 2, 3 requires a new power line 4, 5, 6 directly from a power source 7 or power sources.

Figure 2:
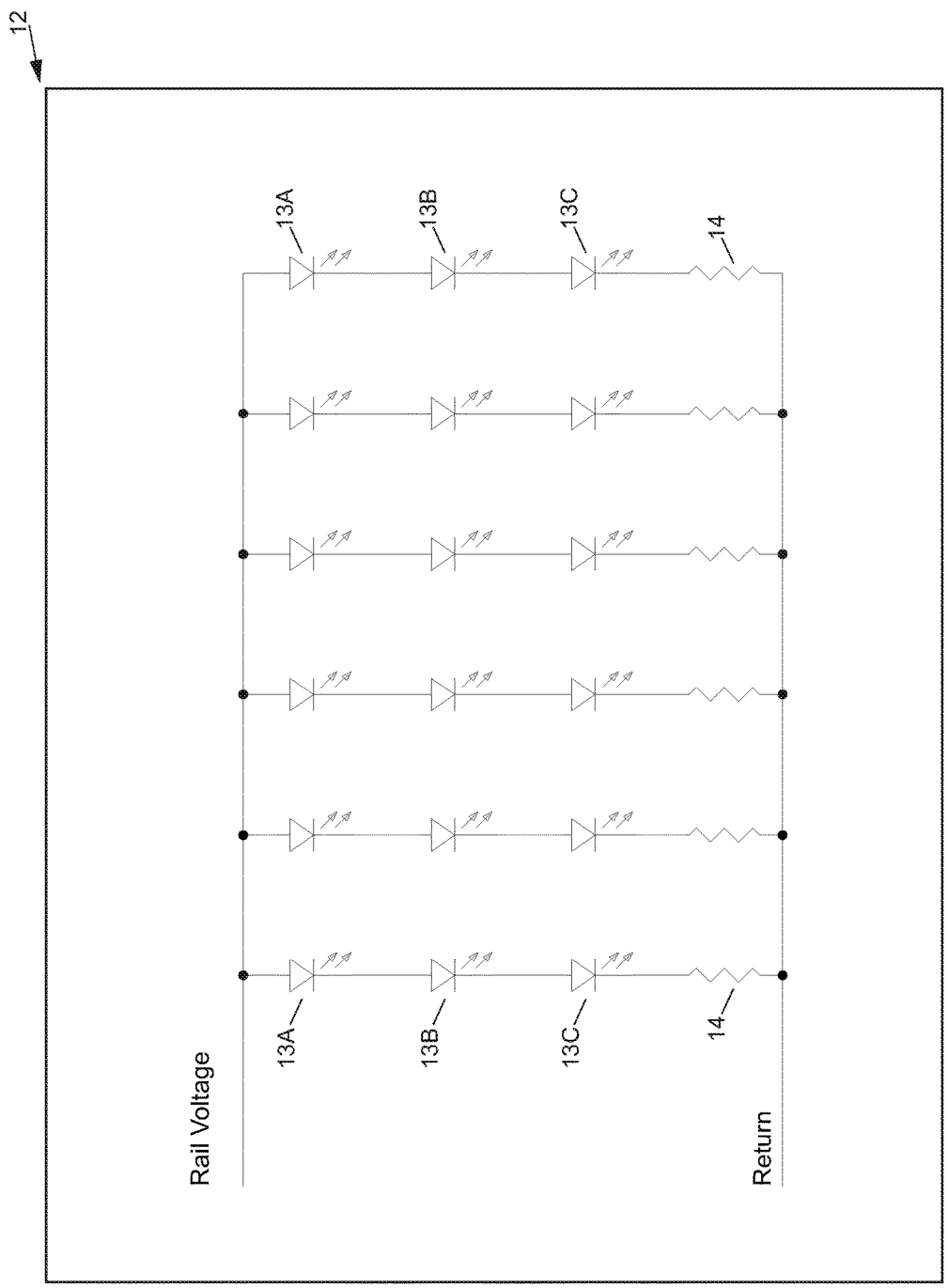
FIG. 2 is an exemplary circuit schematic representative of a commercially available LED strip as of the date of this application.

A simplified circuit schematic 12 of the LED strips of FIG. 1 is illustrated in FIG. 2 (hereafter referred to as the "Ideal Model"). The Ideal Model is characterized by a printed circuit board ("PCB") with a repeating pattern of three (3) LEDs 13A-13C and a resistor 14 in series in a repeating pattern along the LED strip. As understood by the skilled artisan, resistors are employed to ballast the current, thereby controlling the brightness of light emission of each of the corresponding LEDs. For demonstrative purposes below, twelve (12) volts may be used as the rail voltage, three (3) volts may be used as the forward voltage of the LED and 150 ohms as the resistor value. In relation to the first string of LEDs, using Ohms law (Current=voltage/resistance), this calculates to:

$$(12V-(3\times 3V))/150 \text{ ohm}=20 \text{ mA}.$$

In this Ideal Model the voltage continues forever and this pattern can be repeated infinitely. However, the Ideal Model is not realistic as it does not account for the resistance of the traces of the flexible circuits that the LED strips 1, 2, 3 utilize. As understood by persons of ordinary skill in the art, there is a small amount of resistance inherent in the copper traces of the PCBs of each of the LED strips 1, 2, 3. As also understood by the skilled artisan, a common commercially available PCB includes a 0.2 mm (0.008 inch) wide trace that is 0.025 mm (0.001 inch) thick. For such PCB, the resistance is on the order of 0.25 ohms/per inch. This small "parasitic" resistance sets up what is known in the art as a "voltage divider" where the voltage will get continually divided down over the length of an LED strip. While it is possible to make very small, marginal improvements in the performance of a known LED strip by making thicker and wider traces, this is a challenge that will continue with current PCB fabrication and material technologies.

Figure 3:
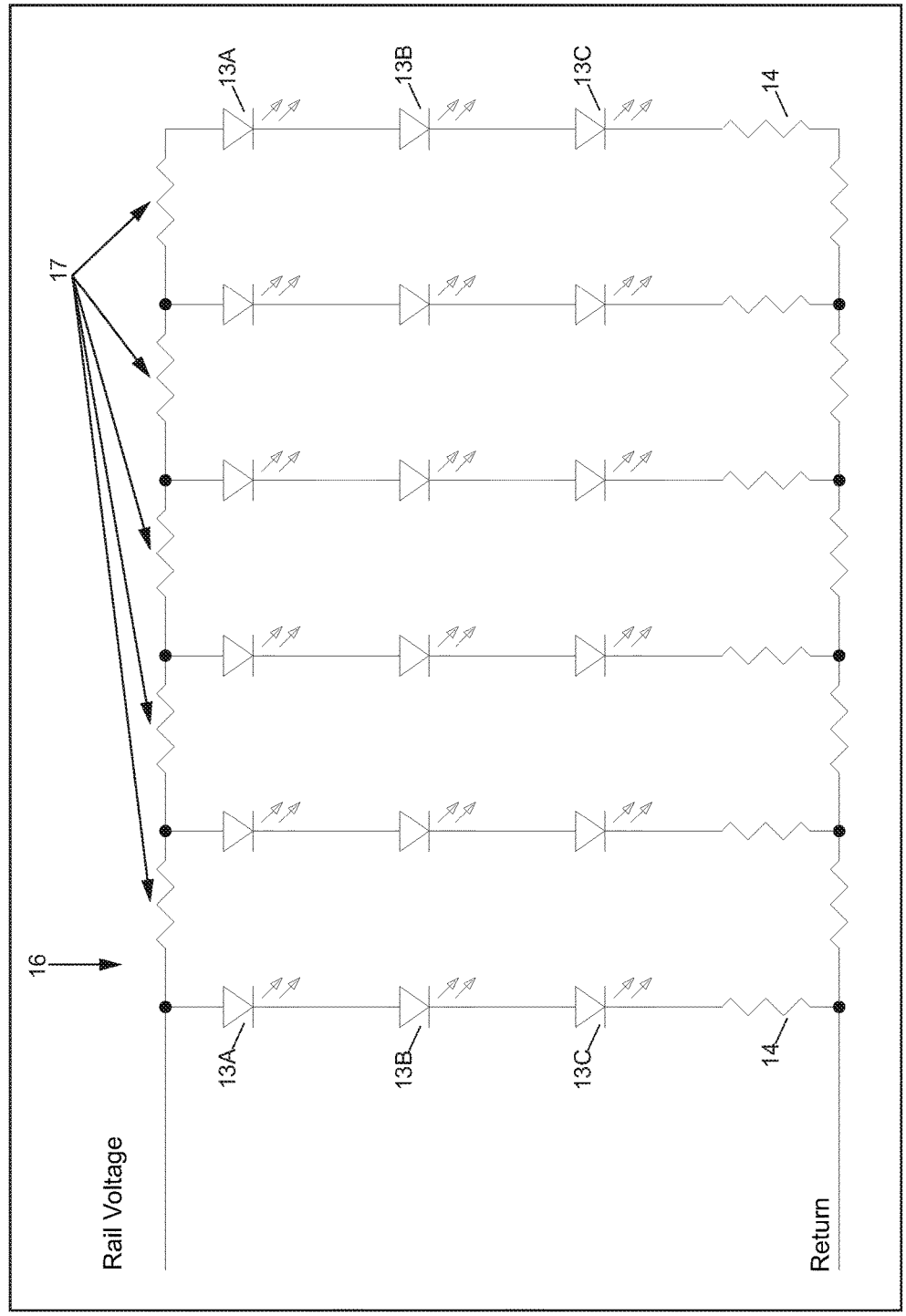
FIG. 3 is an exemplary circuit schematic representative of a commercially available LED strip including a common rail supplying rail voltage.

A schematic 16 of a more realistic commercially available LED strip operates as illustrated in FIG. 3. The additional resistors in this embodiment, referred to as "Parasitic Resistance 17," represent the resistance present in the electrical traces of the PCBs used as a substrate for commercially available LED strips. A full calculation of the voltage drop at each LED location is beyond the scope of this application, however, of importance is that a drop of only about five-percent (5.0%) in voltage leads to about a twenty-percent (20.0%) drop in LED intensity:

$$(11.4V-(3\times 3V))/150 \text{ ohm}=16 \text{ mA}.$$

While the exact details of how the human eye perceives light and the intensity of light is beyond the scope of this application, a twenty-percent (20.0%) difference in light intensity from one end of an LED strip to another is quite noticeable to the naked eye. As a result, to the naked eye, commercially available quasi-continuous LED strips of about ten (10.0) meters come equipped with LEDs that are dimmer to the naked eye, i.e., less bright, downstream near a distal end of a LED strip by about fifty-percent (50.0%) compared to the LED brightness upstream near the voltage input of the same LED strip.

Simply put, current commercially available LED strip electrical systems are passive in that they do not have a mechanism to adapt to the change in voltage. Other methods exist for overcoming parasitic resistance or "PCB resistance," such as significantly increasing the conductor size of the LED strip. However, such methods are not cost effective for providing a commercial light source. The present invention provides an electrical system operationally configured to adapt to drops in voltage, thereby eliminating the problems of known electrical systems discussed above by providing novel LED strips operable in lengths beyond about ten (10.0) meters (32.0 feet). The present invention contemplates novel circuit designs or "active circuits" that, by definition, use feedback to monitor the current through the LED chain as discussed below.

Suitably, the present invention provides specialized LED circuits employing constant current regulators in place of the resistors of the known circuits discussed above, the constant current regulators being operationally configured to modulate current of its corresponding LED circuit on an LED strip. For purposes of this application, a constant current regulator of an LED circuit is operationally configured to overcome variations in voltage by measuring the current in the circuit loop and adjusting its voltage in the circuit loop to maintain a constant current. In other words, the constant current regulator of the present application changes its effective resistance in its LED circuit until a desired current level is achieved. For example, even as the voltage decreases, the LED circuit of this application constantly modulates to the desired current level allowing LEDs of circuits downstream near a distal end of a LED strip to appear substantially similar in brightness to the naked eye as the LEDs located upstream near a proximal end of the LED strip.

Figure 4:
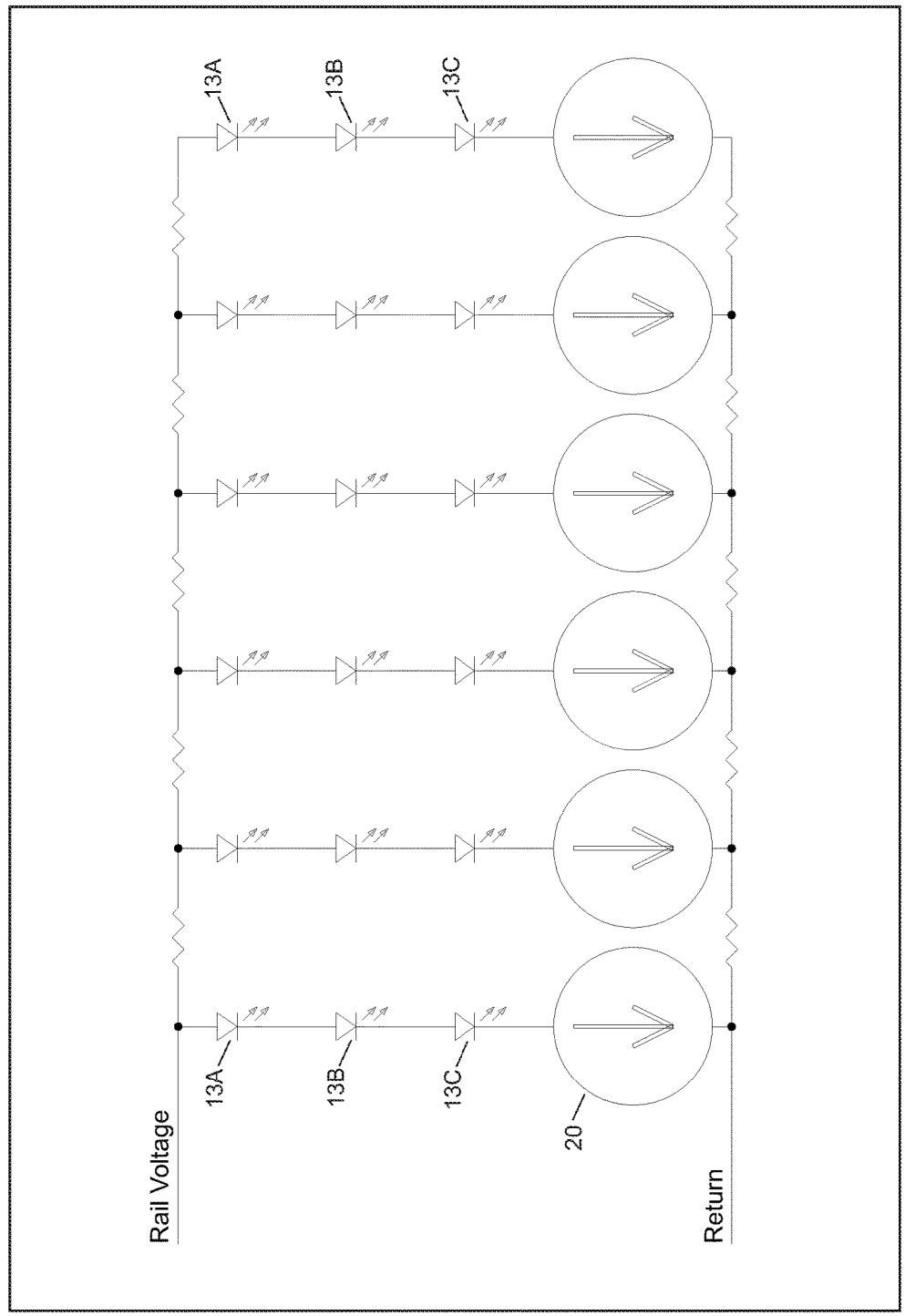
FIG. 4 is an exemplary circuit schematic representative of a twelve volt LED strip including a plurality of constant current drivers.

With attention to FIG. 4, this specialized LED circuit, or "constant current LED circuit 20," may be placed anywhere in the series string of LEDs and still work equivalently as the resistors 14 described above. As understood by persons of ordinary skill in the art, as long as a device is in "series," it will maintain the current anywhere in that series line. As also understood by persons of ordinary skill in the art, a constant current regulator does not extend the length of an LED string indefinitely. For instance, in an exemplary LED strip a particular constant current regulator is suitably effective to maintain all of the LEDs in its LED circuit at constant current until the voltage drops to some margin slightly above where the total of the LED forward voltages meets. In an example where the forward voltage of an LED is 3.0 volts, with three LEDs in series, this calculates to a total forward voltage of 9.0 volts. At the point the rail voltage sags to about 9.0 volts or below, there is no longer enough potential left to maintain proper current and light the LEDs at a consistent brightness. In other words, once the rail voltage falls below the sum of the forward voltages of the LEDs, it becomes difficult to light the LEDs, unless you employ a voltage booster or the like, as there is not enough potential to overcome the required voltages for the LEDs. As such, the present application provides for an LED strip including a plurality of LED circuits, the LED strip extending out to at least about 20.0 meters before the rail voltage falls below the sum of the forward voltages of the LED circuits in the LED strip.

Suitably, the constant current LED circuits 20 of this application are operationally configured to extend functional LED strip lengths to about 20.0 meters or more. An example of a suitable constant current regulator is described at the following internet location: https://www.infineon.com/dgdl/bcr402r.pdf?folderId=db3a30431400ef68011407a9cfc70181&fileId=db3a30431400ef68011407bc2b0a0189. One suitable constant current regulator is commercially available from Infineon Technologies AG 81726 München, Germany under the product type "BCR402R." Electrical characteristics of the BCR402R type are shown below in TABLE 1 below.

TABLE 1

Electrical Characteristics at $T_A = 25°$ C.

| Parameter | Symbol | min. | typ. | max. | Unit |
|---|---|---|---|---|---|
| Characteristics | | | | | |
| Collector-emitter breakdown voltage $I_C = 100$ μA, $I_B = 0$ | $V_{BR(CEO)}$ | 18 | — | — | — |
| Supply current $V_S = 10$ V | $I_S$ | 350 | 440 | 540 | μA |
| DC current gain $I_C = 50$ mA, $V_{CE} = 1$ V | $h_{FE}$ | — | 150 | — | — |
| Internal resistor $I_{Rint} = 10$ mA | $R_{int}$ | 33 | 38 | 47 | Ω |
| Output current $V_S = 10$ V, $V_{out} = 7.6$ V | $I_{out}$ | 18 | 20 | 22 | mA |
| Voltage drop ($V_S - V_E$) $I_{out} = 20$ mA | $V_{drop}$ | — | 0.76 | — | V |
| DC Characteristics with stabilized LED load | | | | | |
| Lowest sufficient supply voltage overhead $I_{out} > 8$ mA | $V_{Smin}$ | — | 1.2 | — | V |
| Output current change versus $T_A$ $V_S = 10$ V | Δ/out//out | — | −0.3 | — | %/K |
| Output current change versus $V_S$ $V_S = 10$ V | Δ/out//out | — | 2 | — | %/K |

Figure 5:
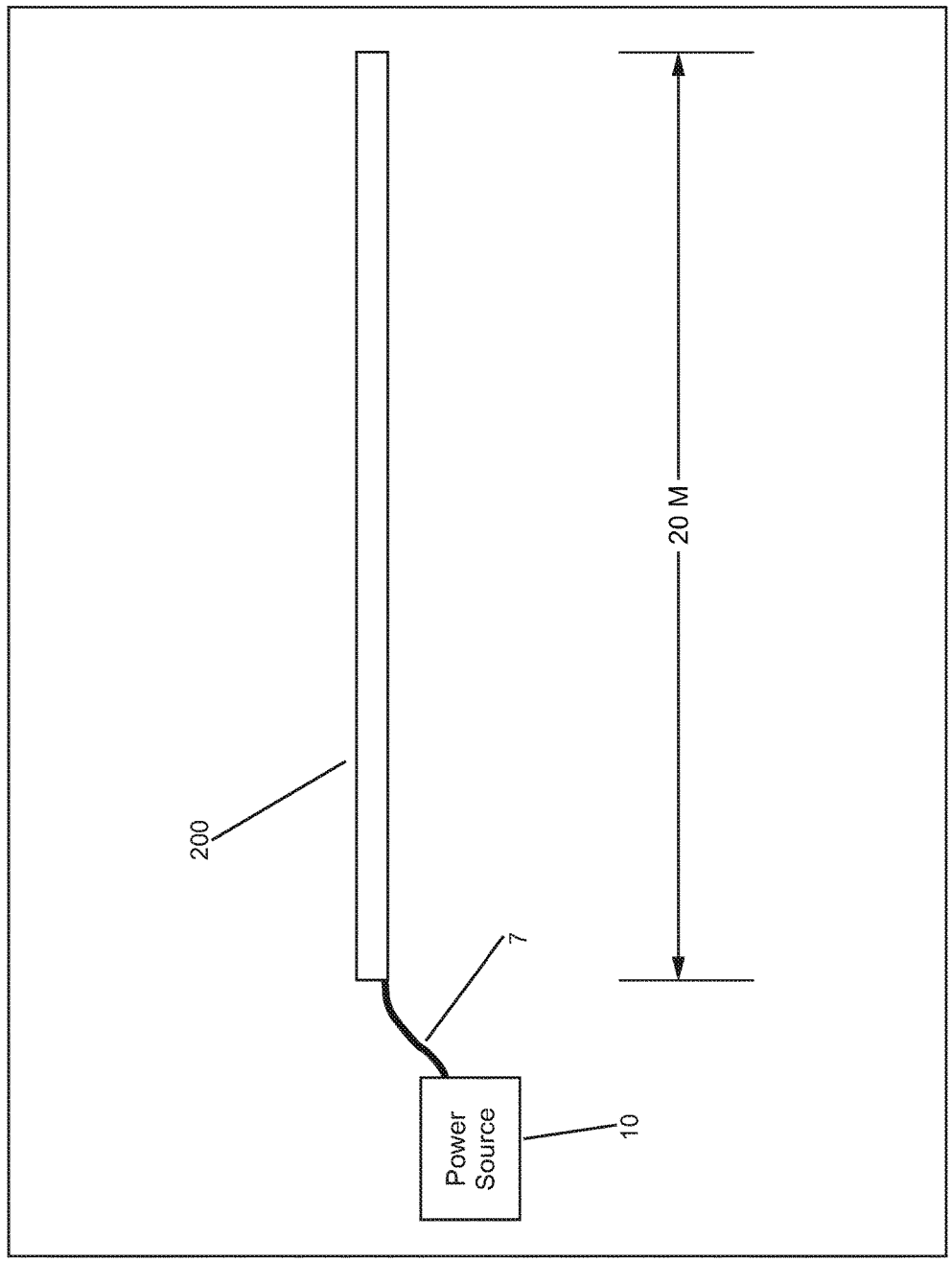
FIG. 5 is an illustration of a simplified LED strip of the present application in communication with a power source.
Figure 6:
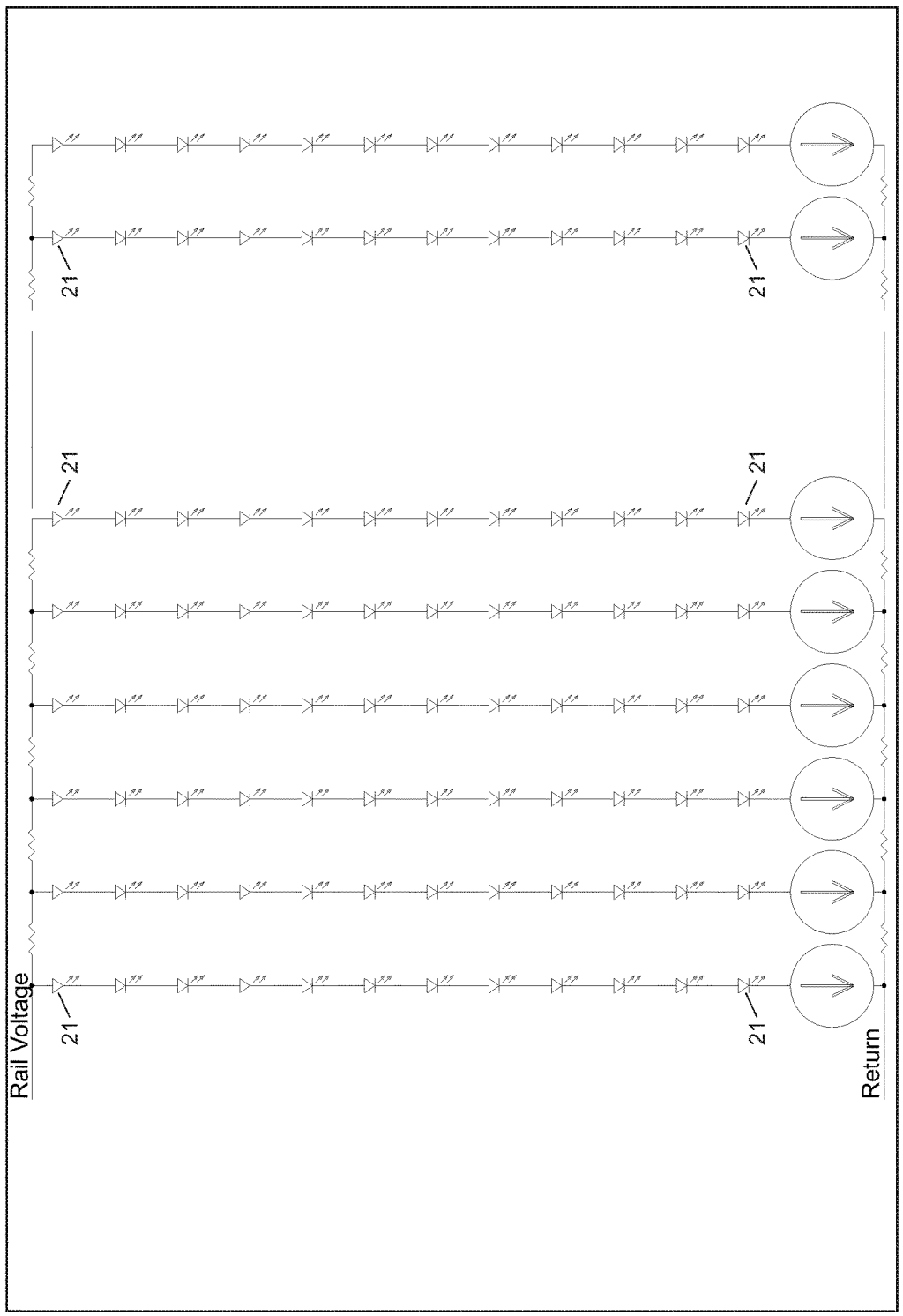
FIG. 6 is an exemplary circuit schematic of a higher DC voltage LED strip than the LED strip circuits of FIGS. 2 and 3.

With reference to FIGS. 5 and 6, in addition to providing constant current LED circuits 20 to the LED strip 200 circuitry for overcoming variations in variable or falling voltages, the lengths of an LED strip 200 may also be extended by increasing the drive voltage. As shown in FIG. 5, a LED strip 200 may be provided at a length greater than 10.0 meters, shown at a length of about 20.0 meters, and include a single power line 7 between the LED strip 200 and the input source of current, i.e., a power source 10. In another embodiment, the LED strip 200 of this application may be provided at a length greater than about 20.0 meters as desired. Herein, the increased length of the LED strip 200 above about 10.0 meters is achieved by increasing the number of LEDs running in series in order to lower the amount of current required to travel through the LED strip 200. For purposes of this application, the achievable LEDs in series is a figure less than drive voltage:

Drive Voltage $> (n \times Vf)$ where: n is the number of LEDs; and
Vf is the forward voltage drop of the LED at a desired operating current and temperature.

In one suitable embodiment, LEDs 21 are spaced at about 60 LEDs per every one (1.0) meter (see FIG. 6, which provides a simplified representation of increased LED 21 running in series). Such a circuit is still considered "Extra-low voltage" according to the International Electrotechnical Commission ("IEC"), which, at the time of this application, defines "Extra-low voltage" as voltage in the range <50 Vrms AC or <120 V DC, as understood by the skilled artisan.

In operation, various LED spacing configurations along an LED strip are possible. For example, on an LED strip having a length of about 20.0 meters and a width from about 0.6 cm to about 1.5 cm, the LED strip may include one LED every 1.91 cm (0.75 inches) or fifty (50) LEDs per every one meter. As understood by the skilled artisan, in commercially available LED strips shorter spacing between LEDs helps to achieve longer length LED strips, but the effect of consistent brightness to the naked eye is diminished because, spatially, the long periodic distance does not allow the light to blend together as typically desired. The present invention overcomes such shortcomings in that it does not have to trade for low LED count to achieve desired lengths up to about 20.0 meters or more. As a result, the LED strip configuration of this application overcomes the fundamental voltage drop allowing for more LEDs to be employed along a LED strip as compared to commercially available LED strips. In other words, the present LED strip configuration may range from about 2.0 times to about 4.0 times greater in length at a given voltage compared to other known commercially available LED strips.

Without limiting the invention to a particular embodiment, a suitable power source 10 includes, but is not necessarily limited to 12-50V DC driver. In addition, a suitable power line 7 includes, but is not necessarily limited to a gauge wire, suitably 22 awg or larger.

The examples of LED strips discussed above all involve single color LED strips. In another embodiment, Red-Green-Blue ("RGB") LEDs may also be employed as part of the present invention. An advantage of incorporating RGB LEDs to a LED strip 200 is that the separate colors of the RGB LEDs may be modulated to create an array of colors other than red, green and blue to the naked eye as well as a plurality of intensities of the RGB colors. As an example, anode connections of an LED strip may be tied together and then three cathodes, i.e., negatives, may be connected separately to a transistor device to modulate or color mix the current, e.g., connected via an N-channel MOSFET connected between the cathode and the ground. In this scenario, a MOSFET acts as an electronic switch that allows controls systems to turn an LED on and off rapidly, e.g., faster than 100 hz, as a way for controlling the brightness of the LED. As understood by persons of ordinary skill in the art, a three-terminal device such as a MOSFET, compared to regular transistors is that a MOSFET requires very little current to turn on (less than 1 mA), while delivering a much higher current to a load (from about 10.0 to about 50 A or more).

Figure 7A:
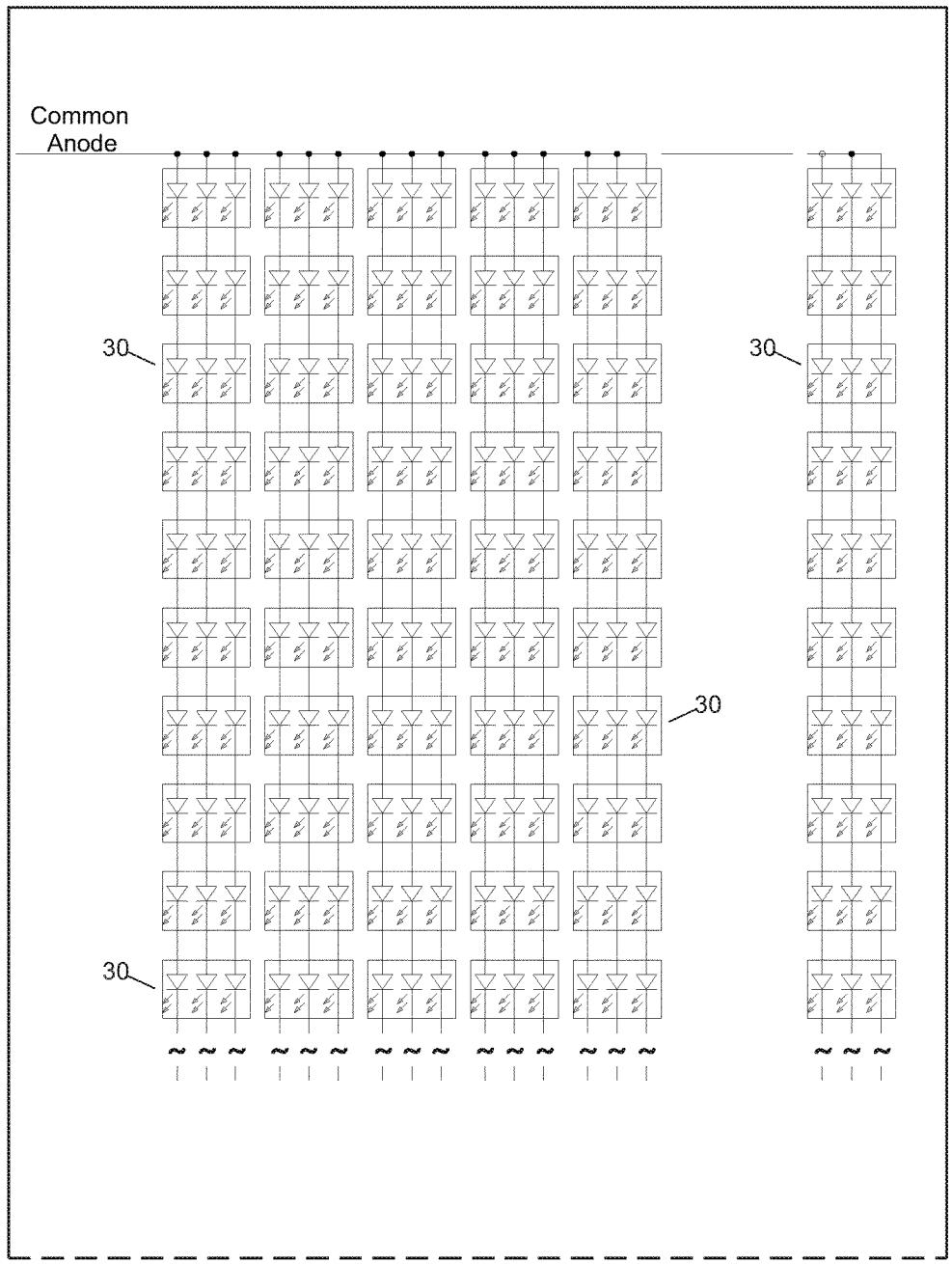
FIG. 7A is a first part of an exemplary circuit schematic of a LED strip as provided in FIG. 6, except with multiple LEDs shown in parallel.
Figure 7B:
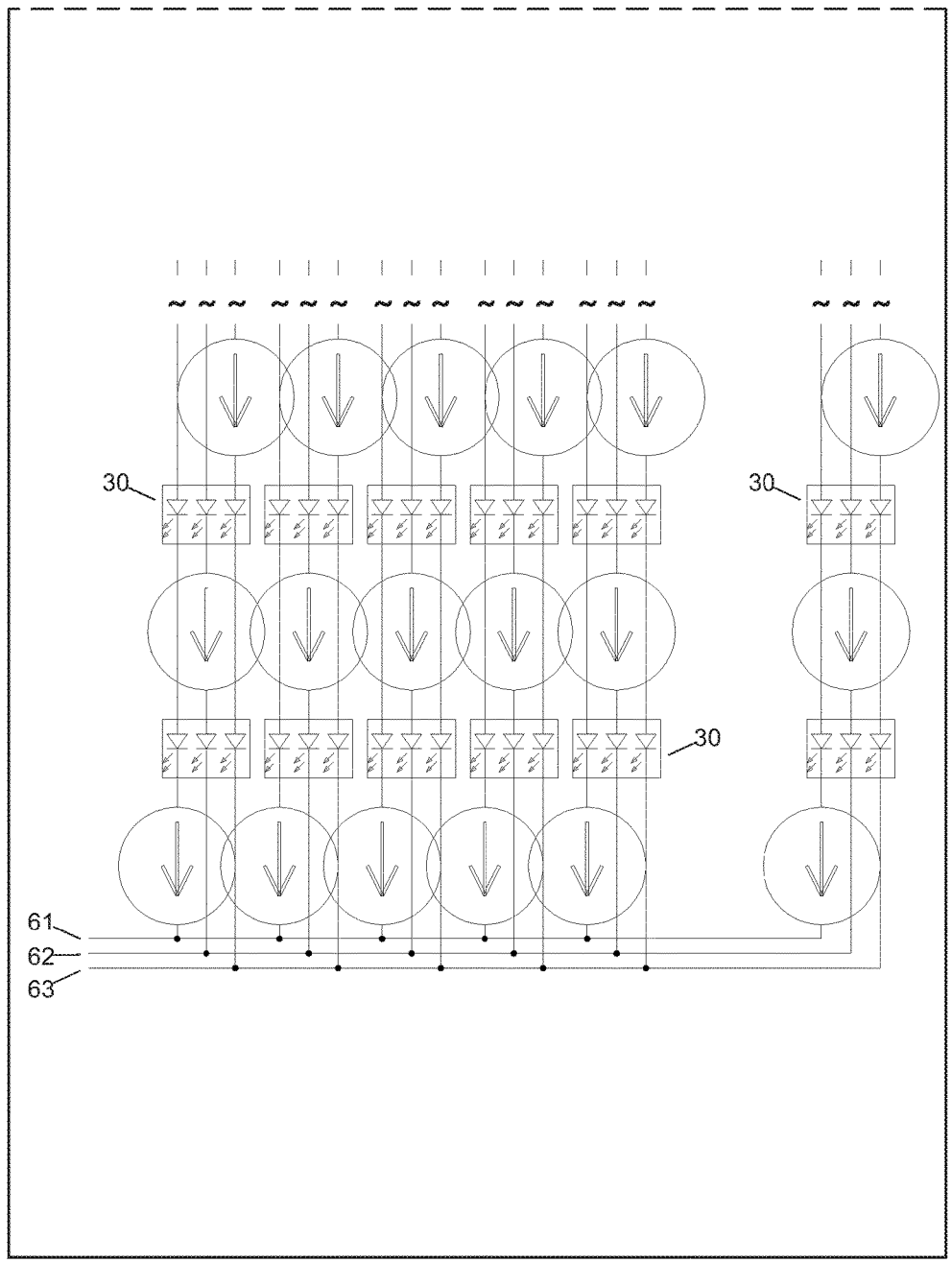
FIG. 7B is a second part of the circuit schematic of FIG. 7A.

In an embodiment of an LED strip 200 employing RGB LEDs, the constant current circuit 20 (see FIG. 7) may be located anywhere in the chain as desired. As illustrated, the RGB LEDs are provided in a single housing 30 in close proximity to one another. In such arrangement, the RGB LEDs are close together allowing the emitted colors of the LEDs to mix together as desired and be perceived by an observer as a single source (see the exemplary embodiment of FIG. 15). In one suitable embodiment, the RGB LEDs are positioned about 1.91 cm (about 0.75 inches) apart from one another within housing 30. This type of arrangement of RGB LEDs allows the circuits of this application to be placed on an LED strip, as otherwise there is not enough space to locate all three constant current circuits 20 between the same LEDs. As such, the invention provides for RGB LEDs co-located in a single package/housing at each LED location along the circuit, which allows for color changing and modulation of each channel in order to change the color as desired—see Red Cathode 61, Green Cathode 62 and Blue Cathode 63). In addition, the above described LED arrangement is operationally configured to provide an LED strip up to about 45.72 meters (about 150.0 feet) in length with only about ten-percent (10.0%) or less LED brightness degradation from voltage input end of the LED strip to the opposing distal end of the LED strip. A suitable RGB LED is commercially available from (1) Cree LEDs at the following internet site: http://www.cree.com/LED-Components-and-Modules/Products/High-Brightness/SMD-Color/SMD-Full-Color; and (2) LITE-ON Technology Corp., New Taipei City, Taiwan, which has the following internet site: http://www.liteon.com/opto.

Figure 9:
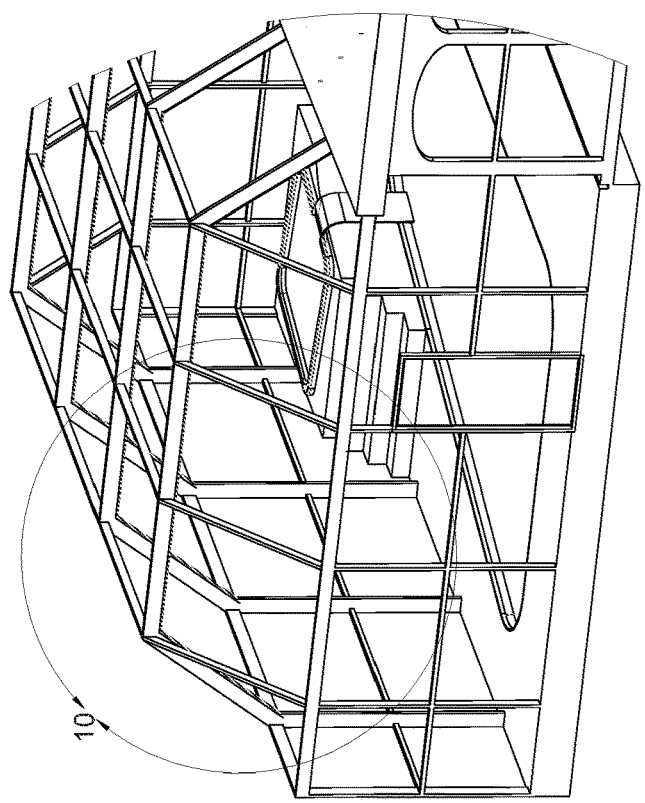
FIG. 9 is a detailed view of a portion of the patio screen enclosure of FIG. 8.
Figure 8:
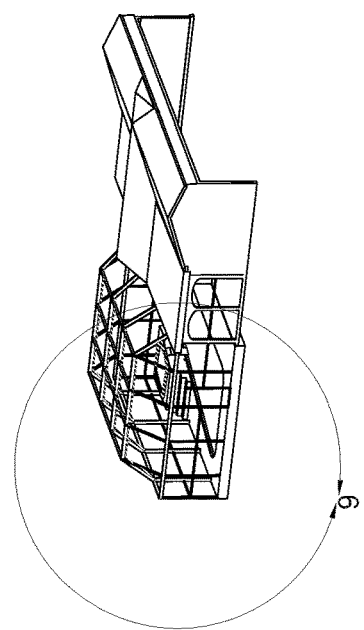
FIG. 8 is a simplified view of a patio screen enclosure.
Figure 10:
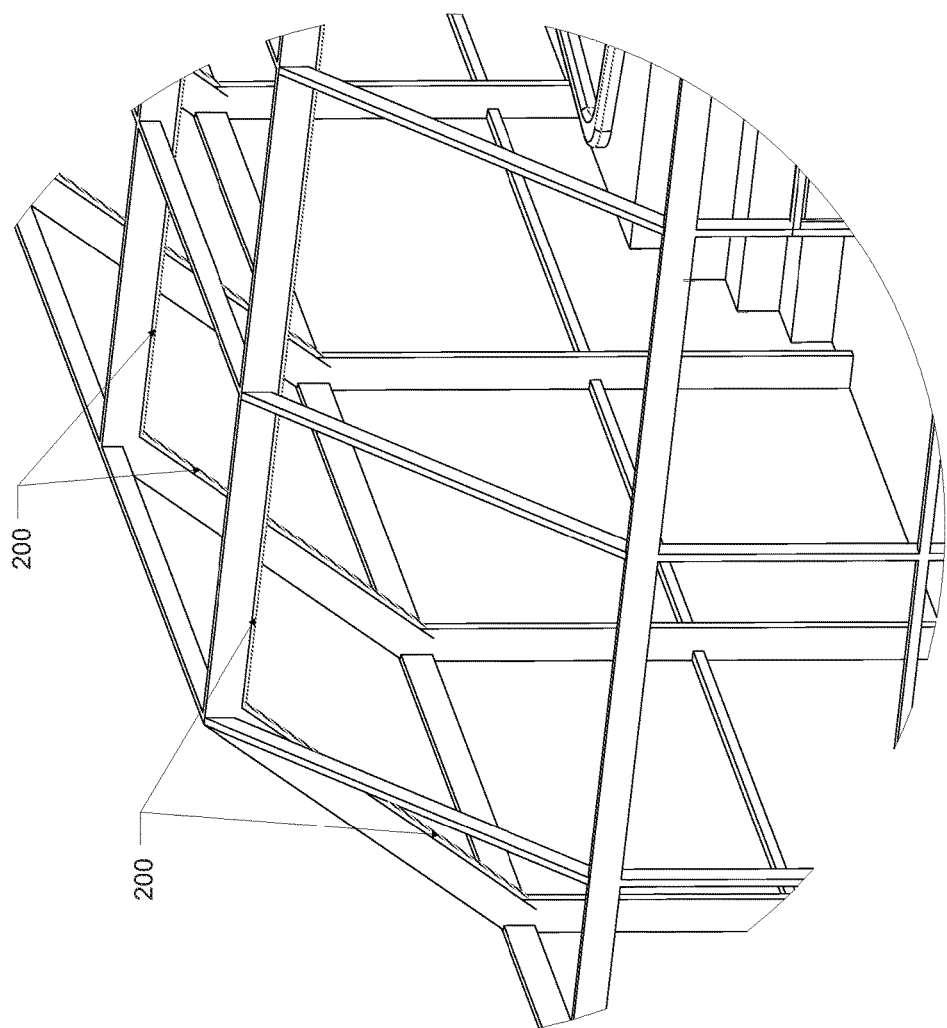
FIG. 10 is detailed view of a portion of the patio screen enclosure of FIG. 9.

In commercial application, the LED strip 200 of this application may be used to provide elongated visual continuous light in architectural settings such as patio screen enclosures (see FIGS. 8-10). One suitable LED strip assembly 150 for architectural use such as patio screen enclosures and the like are shown with reference to FIGS. 11-13. In this embodiment, the LED strip assembly includes an LED strip 200 located inside an LED jacket extrusion member 202, which may be further housed within an outer shell or outer housing member 204 attachable to an architectural surface. In one suitable embodiment, an LED strip 200 may be slid within a corresponding LED jacket extrusion member 202. One or more outer lenses or lens extrusion members 206 may also be employed to cover the LED strip away from site and/or protect the LED strip 200 from the ambient environment. One or more lens extrusion members 206 may also be employed to diffuse light originating from the LEDs along the LED strip 200 in a manner effective to provide a substantially continuous light to the naked eye along the length of the cover. In addition, other housings may be employed for one or more particular LED strip configurations as desired and/or as otherwise required.

As shown, the outer housing member 204 may include a surface configuration effective for an LED jacket extrusion member 202 to be slid within the outer housing member 204 and thereafter held in place during use of the LED strip assembly 150. In particular, the outer housing member 204 may include opposing raised surfaces or lips 208 operationally configured to minimize vertical movement of the LED jacket extrusion member 202 and LED strip 200 housed therein. In the embodiment as shown, the lips 208 suitably contact opposing sides of the LED jacket extrusion member 202 for holding the LED jacket extrusion member 202 in a fixed position, including an inverted or upside down position. In one suitable embodiment, a lens extrusion member 206 may be snap fit into place with a corresponding outer housing member 204. In another embodiment, a lens extrusion member 206 may be adhered to a corresponding outer housing member 204 with one or more adhesives.

Without limiting the invention, a suitable outer housing member 204 may be fabricated from one or more materials as desired. A suitable outer housing member 204 may be fabricated from conductive materials and/or non-conductive materials. Generally, the outer housing member 204 may be constructed of materials including but not necessarily limited to those materials resistant to chipping, cracking, excessive bending and reshaping as a result of ozone, weathering, heat, moisture, other outside mechanical and chemical influences, as well as various impacts and other loads placed on the outer housing member 204. Likewise, the outer housing member 204 may comprise any color or combination of colors, or in the alternative, the outer housing member 204 may be transparent and translucent as desired.

Suitable materials of construction include, metals, wood, plastics, rubbers, filled composite materials, glass, plexiglass, and combinations thereof. Suitable metals include, but are not necessarily limited to stainless steel, steel, aluminum, brass, copper, and combinations thereof. Suitable plastics include, but are not necessarily limited to polyvinyl chloride ("PVC"), vinyl polymers, and combinations thereof. In one embodiment, an outer housing member 204 may be fabricated from multiple attachable parts. In another embodiment, an outer housing member 204 may be fabricated as a single member via a mold or extrusion process. In one particular embodiment, an outer housing member 204 may be provided as a one piece aluminum extrusion member.

The invention will be better understood with reference to the following non-limiting examples, which are illustrative only and not intended to limit the present invention to a particular embodiment.

Example 1

Figure 14:
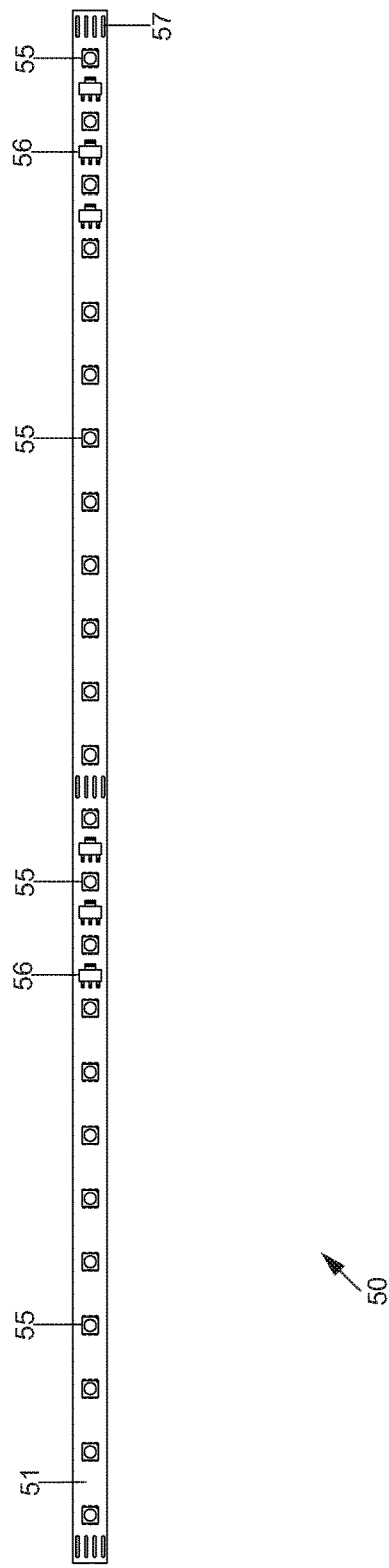
FIG. 14 is atop view of an exemplary LED strip of the present application.

With attention to FIG. 14, in a first non-limiting example an LED strip 50 is provided including a printed circuit board 51 having the following dimensions:
Length: 46.711 cm (18.39 inches);
Width: 1.02 cm (0.40 inches); and
Height: 0.032 cm (0.0125 inches).

The LED strip 50 also includes twenty-four (24) individual LEDS 55, six (6) constant current regulators 56 and solder pads 57 built into the wire of the LED strip 50 as understood by the skilled artisan. The LED strip 50 includes the circuit pattern of FIGS. 7A and 7B implemented twice as shown. The solder pads are used to continually extend this strip to the desired length. As shown, there are twelve LEDs, repeated with a constant current regulator 56 providing an LED strip 50 with two parallel patterns of the twelve LEDs in series.

Example 2

In a second non-limiting example, two five meter rolls of commercially available 12 Volt/60 LED per meter strips are acquired and electronically communicated together for operation as a continuous LED strip. The circuit of the LED strip includes ballasting resistors. Voltage is applied at one end of the continuous LED strip and the intensity of light being emitted from each individual LEDs along the strip is measured for differences in brightness. The light emitted from the LEDs located at about five meters along the length of the strip are measurably dimmer than the LEDs located near the proximal end of the strip. At about six meters, the light emitted from the corresponding LEDs is visibly dimmer. Near the distal end of the strip at about 10.0 meters, light was almost nonexistent in relation to the corresponding LEDs.

Subsequently, all of the ballasting resistors are replaced with constant current regulators. Using constant current regulators, twenty meters of the same LED strip material is used continuously with no measurable degradation of optical intensity of light emission amongst the LEDs disposed along the LED strip.

As will be understood by those of ordinary skill in the art, and others, many modifications may be made without departing from the spirit and scope of the invention. The embodiments described herein are meant to be illustrative only and should not be taken as limiting the invention, which is defined in the following claims.

I claim:

1. An LED strip of a repeating pattern of LED circuits, comprising:
    a printed circuit board;
    each LED circuit of the LED strip including a constant current regulator and a plurality of LEDs in serial configuration with the constant current regulator providing a plurality of parallel combinations of LEDs and constant current regulators in serial configuration,
    wherein the LED strip is operationally powered by a single power source of a particular input voltage, the power source operating as a single input source of current of the LED strip,
    wherein the LED circuits are disposed along the length of the printed circuit board at different distances from the single power source,
    each of the constant current regulators being operationally configured to modulate current of its corresponding LED circuit to overcome variations in voltage by measuring the current in its corresponding LED circuit and adjusting its own corresponding voltage to maintain a constant current in its LED circuit;
    wherein the LED strip extends a predetermined distance before a rail voltage of the LED strip falls below the sum of forward voltages of the LEDs in the LED strip,
    wherein the LED strip includes a drive voltage,
    wherein the length of the LED strip is increasable by increasing the number of LEDs in series
    wherein an achievable number of LEDs in series is a figure less than the drive voltage according to the formula:

$$\text{Drive Voltage} > (n \times Vf)$$

wherein n is the number of LEDs, and Vf is the forward voltage drop of the LEDs at a predetermined operating current and temperature.

2. The LED strip of claim 1 wherein the LED strip includes a length of about 20.0 meters.

3. The LED strip of claim 1 further including a secondary diffuser.

4. The LED strip of claim 1 wherein the LED strip includes a length of about 20.0 meters and a width from about 0.6 cm to about 1.5 cm and fifty LEDs per every one meter.

5. The LED strip of claim 1 wherein the power source is a 12-50V DC driver.

6. The LED strip of claim 1 including a plurality of Red-Green-Blue LEDs.

7. The LED strip of claim 6 wherein Red-Green-Blue LEDs are provided in housings.

8. The LED strip of claim 7 wherein the Red-Green-Blue LEDs in a particular housing are positioned about 1.91 cm apart from adjacent LEDs.

9. The LED strip of claim 1 wherein the LED strip is operationally configured for architectural use.

10. The LED strip of claim 1, wherein the predetermined distance of the LED strip extends a distance of about 20.0 meters before the rail voltage of the LED strip falls below the sum of forward voltages of the LEDs in the LED strip.

11. An illuminable LED strip system, comprising:
    an LED strip assembly including a printed circuit board and a repeating pattern of LED circuits disposed along the printed circuit board; and
    a single voltage power source in electrical communication with the LED strip, the power source operating as a single input source of current of the LED strip;
    wherein each LED circuit of the LED strip includes a constant current regulator and a plurality of LEDs in serial configuration with the constant current regulator providing a plurality of parallel combinations of LEDs and constant current regulators in serial configuration; and
    wherein each of the constant current regulators is operationally configured to modulate current of its corresponding LED circuit to overcome variations in voltage by measuring the current in its corresponding LED circuit and adjusting its own corresponding voltage to maintain a constant current in its LED circuit,
    wherein the LED strip extends a predetermined distance before a rail voltage of the LED strip falls below the sum of forward voltages of the LEDs in the LED strip,
    wherein the LED strip includes a drive voltage,
    wherein the length of the LED strip is increasable by increasing the number of LEDs in series
    wherein an achievable number of LEDs in series is a figure less than the drive voltage according to the formula:

$$\text{Drive Voltage} > (n \times Vf)$$

wherein n is the number of LEDs, and Vf is the forward voltage drop of the LEDs at a desired operating current and temperature.

12. The LED strip system of claim 11 wherein the LED strip assembly further includes an LED jacket extrusion member.

13. The LED strip system of claim 12 wherein the LED strip assembly further includes an outer housing member operationally configured to house the LED jacket extrusion member.

14. The LED strip system of claim 13 wherein the LED strip assembly further includes at least one lens extrusion member operationally configured to diffuse light originating from the LEDs.

15. The LED strip system of claim 14 wherein the LED strip assembly is operationally configured to be secured to one or more architectural support members.

16. The LED strip system of claim 13 wherein the LED jacket extrusion member is slidable within the outer housing member.

17. The LED strip system of claim 11 wherein the LEDs include a plurality of Red-Green-Blue LEDs.

* * * * *